United States Patent
Davies et al.

(10) Patent No.: US 6,928,895 B2
(45) Date of Patent: Aug. 16, 2005

(54) BALLSCREW LOCKING NUT

(75) Inventors: Jonathan Davies, Western Downs (GB); Brian Farley, Hartpury (GB); Neil Venables, Wores (GB)

(73) Assignee: Smiths Wolverhampton Limited, Wolverhampton (GB)

(*) Notice: Subject to any disclaimer, the term of this patent is extended or adjusted under 35 U.S.C. 154(b) by 151 days.

(21) Appl. No.: 10/214,246

(22) Filed: Aug. 6, 2002

(65) Prior Publication Data

US 2003/0029258 A1 Feb. 13, 2003

(30) Foreign Application Priority Data

Aug. 9, 2001 (GB) ............................................ 0119444
Sep. 21, 2001 (GB) ............................................ 0122832

(51) Int. Cl.[7] .......................... F16H 21/00; F16H 27/00; F16H 27/02
(52) U.S. Cl. ..................... 74/89.26; 74/22 A; 74/112; 49/139; 244/75 R
(58) Field of Search .......................... 74/89.26, 89.23, 74/89.27, 89.36, 22 A, 112; 49/139, 341; 244/75 R

(56) References Cited

U.S. PATENT DOCUMENTS

| 3,766,790 A | * | 10/1973 | Weir ......................... 74/89.26 |
| 4,603,594 A | * | 8/1986 | Grimm ....................... 74/89.39 |
| 4,637,272 A | * | 1/1987 | Teske et al. ................ 74/89.26 |
| 4,644,811 A | * | 2/1987 | Tervo ...................... 74/412 TA |
| 4,679,485 A | * | 7/1987 | Nelson et al. ............. 89/36.02 |
| 4,745,815 A | * | 5/1988 | Klopfenstein ............. 74/89.25 |
| 5,144,851 A | * | 9/1992 | Grimm et al. ............. 74/89.26 |
| 5,313,852 A | * | 5/1994 | Arena ........................ 74/89.35 |
| 6,234,034 B1 | * | 5/2001 | Ando .......................... 74/89.14 |
| 6,389,915 B1 | * | 5/2002 | Wngett ...................... 74/89.23 |

FOREIGN PATENT DOCUMENTS

| DE | 298 16 790 U1 | | 9/1998 |
| DE | 200 08 048 U1 | | 5/2000 |
| EP | 1262688 A2 | * | 12/2002 |
| GB | 0112984D | * | 7/2001 |
| WO | WO 95/10716 | | 4/1995 |

OTHER PUBLICATIONS esp@cenet database: EP126688 patent family list.*

* cited by examiner

Primary Examiner—David A. Bucci
Assistant Examiner—Colby Hansen
(74) Attorney, Agent, or Firm—Reising, Ethington, Barnes, Kissler, P.C.

(57) ABSTRACT

A ballnut assembly is provided in which a locknut (20), which is normally unloaded becomes loaded in the event of failure of a primary load path. This loading causes relative motion between locking nut (24) and the threads of a shaft (8) such that on clearance there between is eliminated. This causes frictional forces to initiate a lock-up of the locknut.

16 Claims, 6 Drawing Sheets

BALLSCREW LOCKING NUT

FIELD OF THE INVENTION

The present invention relates to a ballscrew locking nut, to an actuator mechanism including a ballscrew locking nut, and a trimmable horizontal stabilizer actuator mechanism including a ballscrew and ballscrew locking nut or to an aircraft flap system including such a ballscrew and ballscrew locking nut.

BACKGROUND OF THE INVENTION

The vast majority of conventional aircraft have a pair of horizontal stabilizers mounted at the rear of the fuselage. The horizontal stabilizers provide the aircraft with longitudinal pitch stability in flight. In larger aircraft, for example commercial passenger aircraft, the horizontal stabilizers are trimmable i.e. moveable, to allow adjustments to the longitudinal pitch of the aircraft to be made during flight. Such adjustments may be necessary to take into account the changing center of a gravity of the aircraft as the fuel load carried is reduced through fuel consumption.

One known mechanical actuator that is used to move the horizontal stabilizers for trimming purposes is a ballscrew and corresponding ballnut. A ballscrew is a cylindrical shaft having an integral screw thread formed on it. The shaft is rotated using a motor drivingly connected to one end of the shaft. Mounted on the ballscrew is a ballnut that has a corresponding thread formed on its interior. The horizontal stabilizer is mechanically connected to the ballnut. Rotation of the ballscrew causes the ballnut to translate linearly along the ballscrew and thus transmit the linear motion to the horizontal stabilizer via the coupling mechanism.

It is often a requirement of aircraft components and mechanisms that the mechanisms or components have redundancy in the event of a failure. By redundancy it is meant that in the event of failure of a primary component or mechanism there is at least a secondary component or mechanism provided to allow safe operation of the mechanism to continue or to hold it in a fixed position.

SUMMARY OF THE INVENTION

According to a first aspect of the present invention there is provided a ballnut assembly having a primary load path nut in threaded engagement with a ballscrew shaft and a secondary load path nut in threaded engagement with the ballscrew shaft, the primary load path nut forming a primary load path for transmitting a load between a load element and the ballscrew shaft, wherein in the event of failure of the primary load path linear translation of the primary load path nut with respect to the ballscrew shaft is substantially prevented in at least one direction.

In the event of failure of the primary load path, the load is transferred to the secondary load path. This causes the actuator having the ballnut assembly therein to undergo either restricted motion or, preferably, to become immobilized. Preferably the actuator is part of a horizontal stabilizer actuator mechanism which is immobilized in the event of failure of the primary load path, thereby enunciating the failure and limiting the fatigue exposure of the secondary load path. It is important that failure of the primary load path should be self enunciating as otherwise the aircraft might continue to be used in this failed state. Failure of the secondary load path would then be potentially catastrophic.

Preferably, said secondary load path nut comprises a first threaded portion and a second threaded portion, said first and second threaded portions being connected together by means of a frangible connector. Alternatively the first and second threaded portions may be held in relationship to one another by a connection which allows relative motion between the portions when the torque there between exceeds a predetermined value.

Preferably, said secondary load path nut is connected to said primary load path nut, such that they translate along the ballscrew shaft together.

Preferably, said first threaded portion and said second threaded portion of said secondary load path nut are dimensioned to have a running clearance between their respective threads and the thread of said ballscrew shaft during normal operation. Preferably, the running clearance between the thread of said first threaded portion is greater than the running clearance of said second threaded portion. Preferably, in the event of failure of said primary load path, said running clearance of the second threaded portion is eliminated, thereby bringing said second threaded portion into frictional contact with said ballscrew shaft, whereby said second threaded portion of said secondary load nut is urged to rotate with said ballscrew shaft in the event of a failure of the primary load path due to said frictional contact.

Preferably, said rotational movement of said second threaded portion causes said frangible connector to fracture thereby permitting relative movement between said first threaded portion and said second threaded portion. The degree of movement need only be small enough to cause the threads of the first threaded portion and the secondary threaded portion of the secondary load path to come into frictional engagement with the ballscrew shaft.

This motion tends to cause the first and second threaded portions to move with respect to one another which further increases the frictional forces.

Preferably, a low friction rotational bearing is provided at an interface between said first threaded portion and said second threaded portion. Preferably said low friction rotational bearing comprises an integral ball race.

According to a second aspect of the present invention there is provided a trimmable horizontal stabilizer actuator mechanism comprising a threaded ballscrew shaft and ballnut assembly according to the first aspect.

According to a third aspect of the present invention, there is provided a locknut for use with an actuator having a primary load nut driven along a threaded shaft, the locknut being placed in a secondary load path such that it becomes subjected to a load in the event of failure within the primary load path, wherein the locknut comprises first and second threaded portions which, when the nut is not loaded, have a clearance with the threaded shift; and when the nut is loaded, the running clearance between the threaded portions and the shaft is eliminated causing the locknut to resist translation along the shaft.

BRIEF DESCRIPTION OF THE DRAWINGS

An embodiment of the present invention will now be described, by way of example, with reference to the accompanying figures, in which.

DETAILED DESCRIPTION OF PREFERRED EMBODIMENTS

Figure 1:
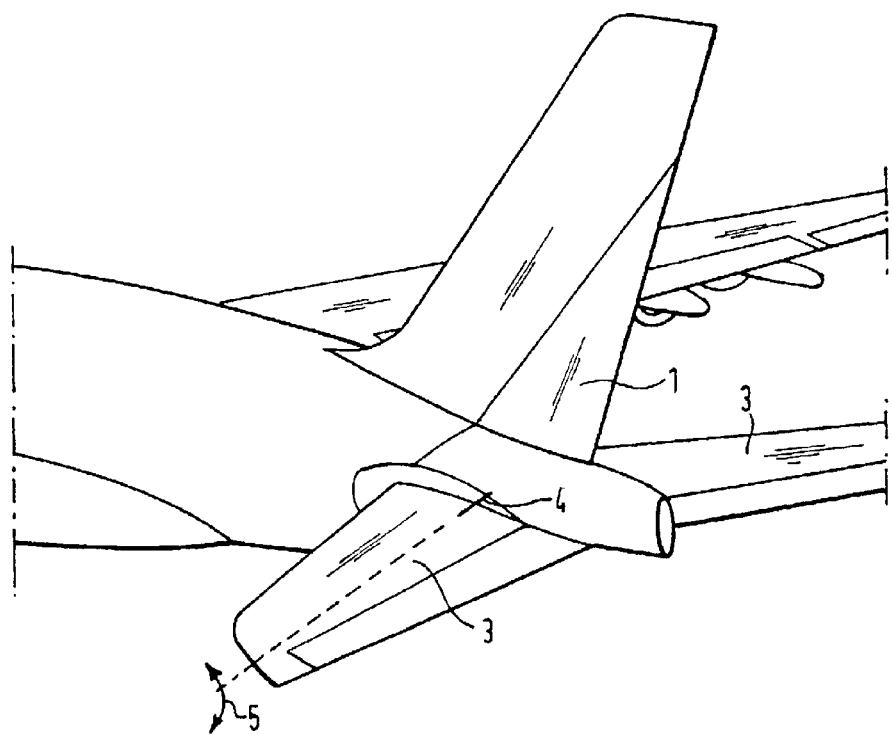
FIG. 1 is a schematic illustration of the arrangement of horizontal stabilizers at the rear of an aircraft.

FIG. 1 illustrates the general configuration of the rear fuselage of an aircraft having trimmable horizontal stabilizers. The aircraft has a tail fin 1 which carries the aircraft rudder. Mounted horizontally on opposing sides of the rear fuselage are the horizontal stabilizers 3. Each horizontal stabilizer 3 is pivotably mounted to the fuselage at a pivot point 4, thus allowing each horizontal stabilizer to be pivoted about the pivot point 4 as indicated by the double headed arrow 5. By pivoting the horizontal stabilizers 3 the longitudinal pitch of the aircraft can be adjusted. The positioning of the horizontal stabilizers may be automatically controlled directly from the aircraft's flight control computers, or may be manually controlled from a pilot input command.

Figure 2:
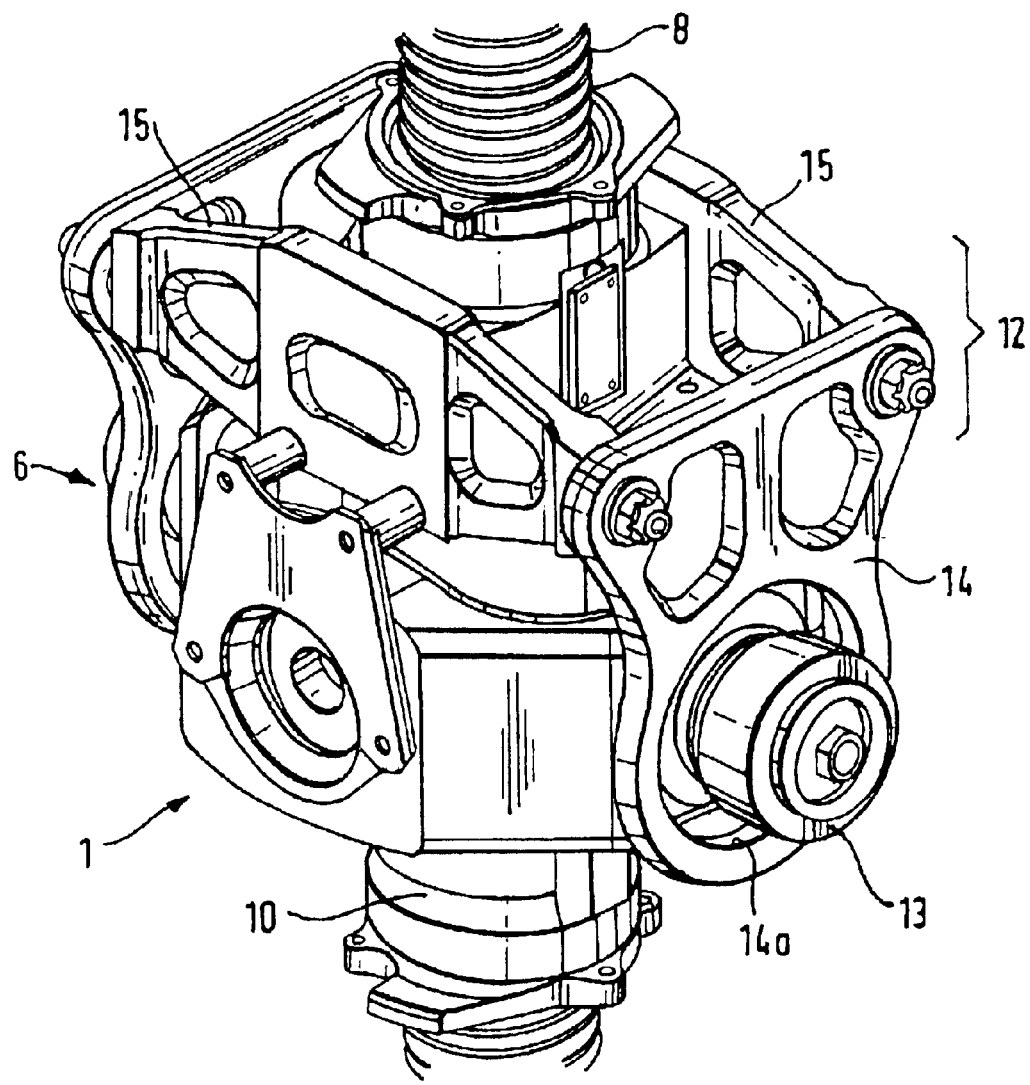
FIG. 2 is a perspective view of a ballnut according to the present invention mounted on a ballscrew.

In the present invention the mechanism for causing the horizontal stabilizers 3 to move includes a ballscrew and ballnut. FIG. 2 shows a ballnut 6 according to an embodiment of the present invention mounted on a ballscrew 8. The ballnut 6 actually comprises two nuts, a primary ballnut 10 and a secondary load path nut generally indicated 12. The primary ballnut 10 is connected to the horizontal stabilizer 3 by means of a known arrangement of connecting elements. However, in general terms a strut (not shown) pivotally attaches to a spherical bearing of a gimball 13 formed as in integral part of the primary ballnut 10. A similar gimball is formed on the other side of the device.

Both the primary ballnut 10 and the secondary load path nut 12 have an internal thread that corresponds to the thread formed on the ballscrew 8. Thus rotation of the ballscrew 8, driven by a known motor mechanism, causes linear translation of the ballnut assembly 6 along the ballscrew 8. Ordinarily, the aerodynamic load exerted on the horizontal stabilizers is transmitted to the primary ballnut 10 via gimball 13.

A side plate 14 has an aperture 14a that surrounds the gimball 13. The side plate is connected to the body of the secondary load path nut 12 via load bearing members 15. The side plate 14 and members 15 constitute a secondary load path which comes into effect in the event of failure of the gimball 13.

Normally the fixing end of the strut (not shown) which attaches to the gimball 13 does not contact the side plate 14. However, if the gimball 13 (or the bearings making the pivotal connection) fails, then the strut moves slightly and becomes able to bear against the side plate 14. This in turn causes the load to be borne by the secondary load path nut 12.

Figure 3:
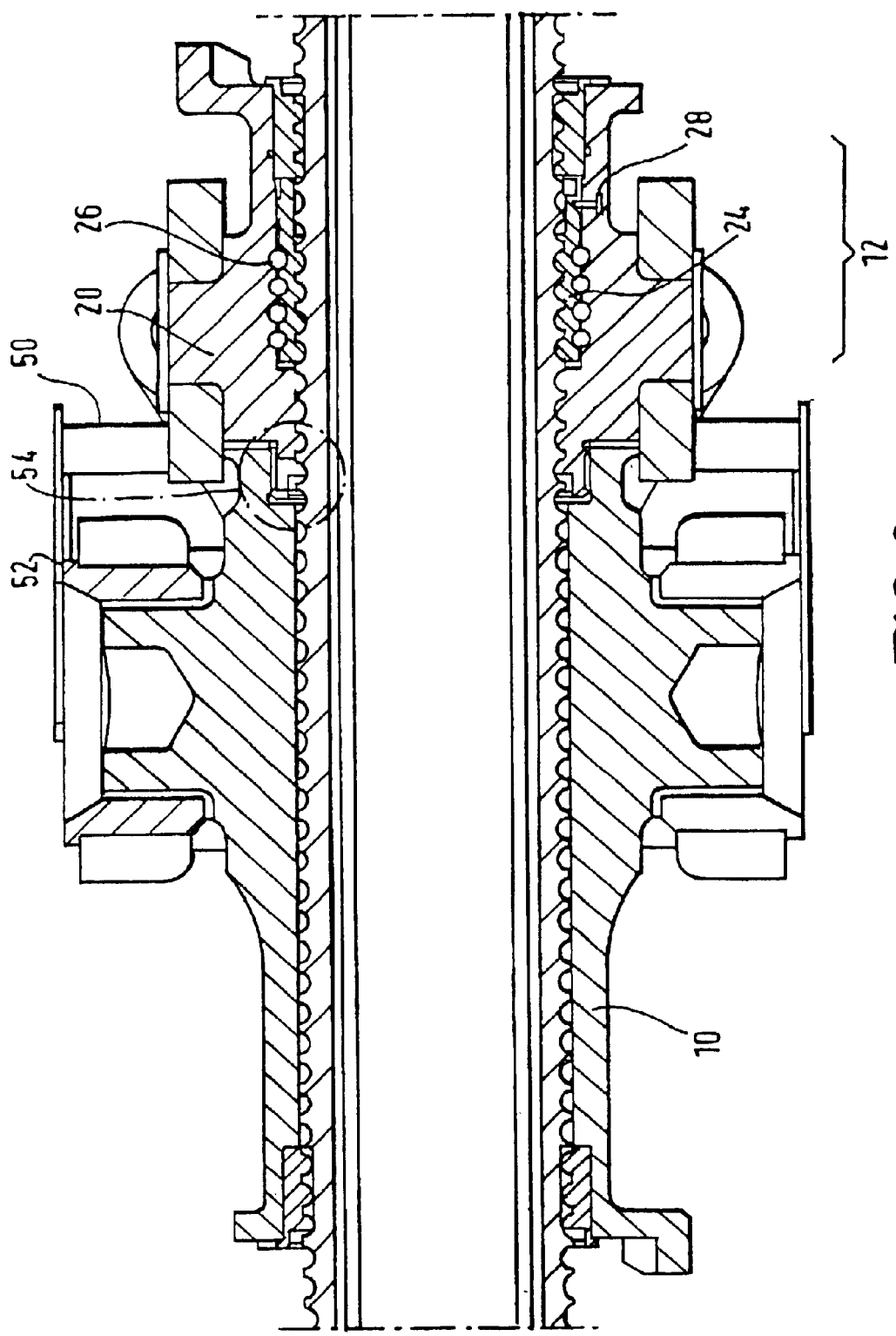
FIG. 3 is a cross-sectional diagram of the ballnut and ballscrew shown in FIG. 2.

A cross-sectional diagram of the ballnut and ballscrew of FIG. 2 is shown in FIG. 3. The primary ballnut 10 is coupled to the primary load path via gimball 13.

The secondary load path nut 12 itself comprises of two parts. The first part, referred to herein as a secondary load path load bearing nut 20, is configured with a mounting flange (not shown on FIG. 3) that is connected to the primary ballnut 10 by bolts. The second part, referred to herein as the locking nut 24, is coupled to the secondary load path nut 20 by an integral bearing race 26 and a shear pin 28. A female thread form, matching that of the ballscrew shaft, is produced in both parts. The secondary load path nut 12 is configured such that the running clearance in the thread of the locking nut 24 is less than the running clearance in the secondary load path load bearing nut 20.

Figure 4:
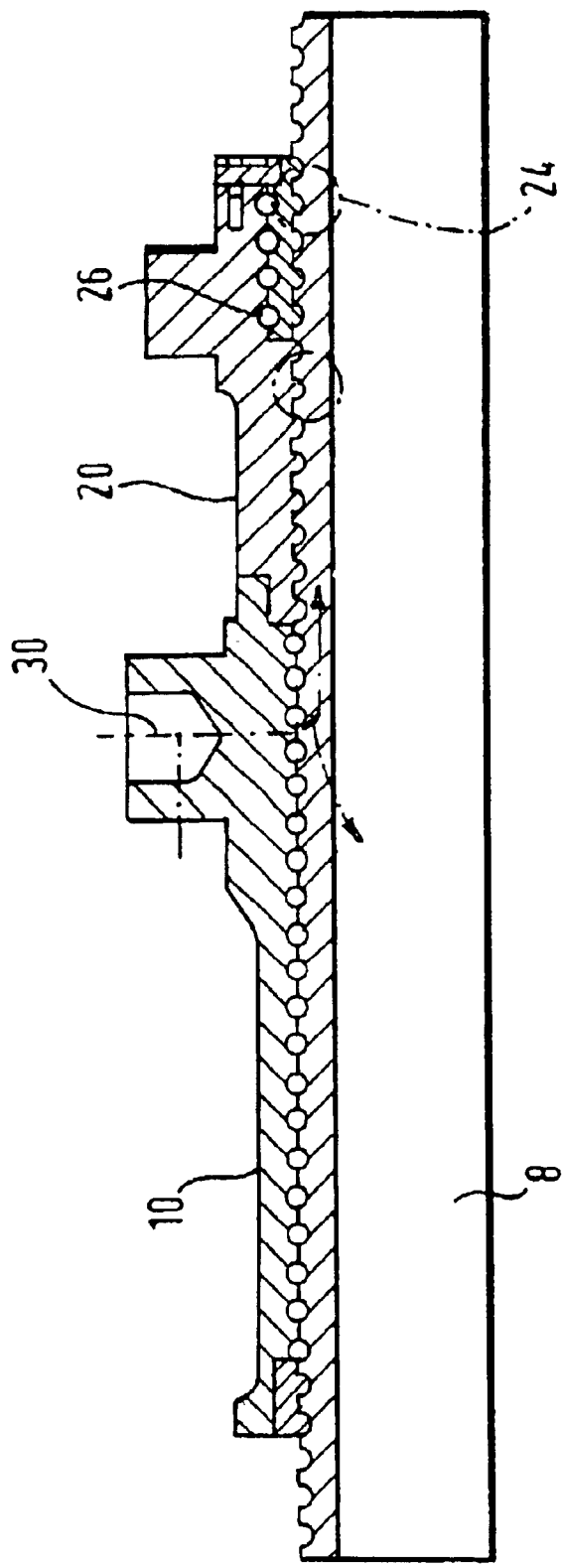
FIG. 4 is a partial cross-sectional view of the ballnut shown in FIG. 3 during normal conditions.
Figure 5:
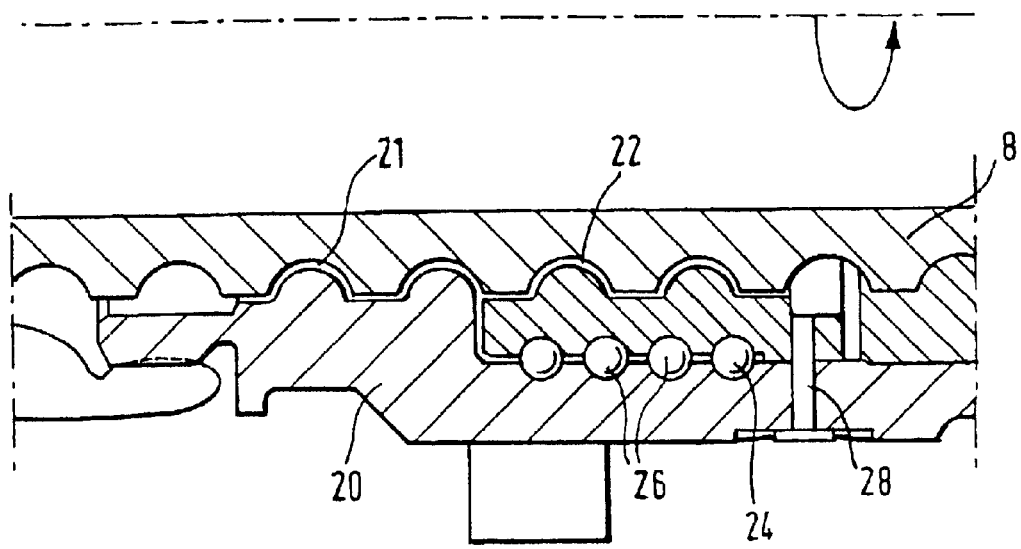
FIG. 5 is an expanded detail of parts of FIG. 4.

FIG. 4 shows a partial cross-section of the ballscrew 8, the primary load path nut 10 and the secondary load path nut 12 under normal conditions. During normal operation, in which the primary aerodynamic load path is loaded, the primary load path being indicated by the chain line 30 in FIG. 4, rotation of the ballscrew 8 will cause the primary load path nut 10 to translate. The secondary load path nut 12, being attached to the primary load path ballnut 10, will move in unison. The female thread of the secondary load path load bearing nut 20 and locking nut 24 do not contact the ballscrew under these conditions. FIG. 5 illustrates the clearances 21 and 22 between the screw threads of the secondary load path load bearing nut 20 and locking nut 24, respectively, and the ballscrew 8. As previously stated, the clearance between the locking nut 24 and the thread of the ballscrew 8, indicated 22 in FIG. 5, is less than the clearance between the thread of the secondary load path load bearing nut 20 and the ballscrew thread, shown as reference numeral 21.

Figure 6:
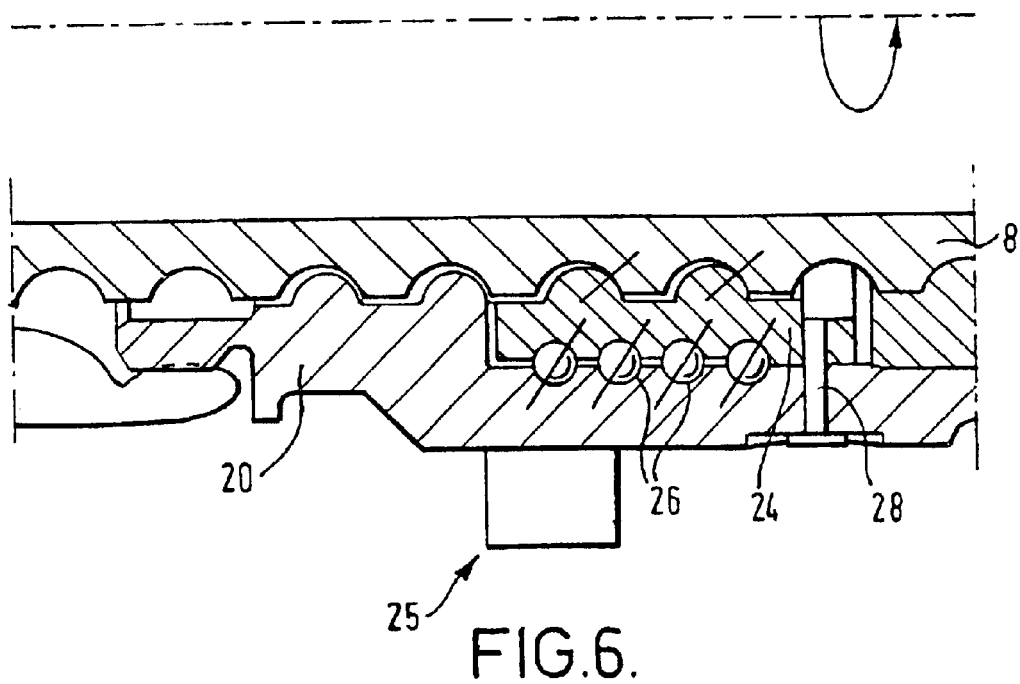
FIG. 6 is a partial cross-sectional diagram of the ballnut of FIG. 3 immediately after a failure in the primary load path.

FIG. 6 shows the arrangement of the secondary load path load bearing nut 20 and locking nut 24 immediately following a failure in the primary load path nut 10, by, for example, loss of ball bearings from the primary load path nut 10. In the event of failure of the primary load path nut by virtue of loss of the recirculating balls, load is transferred from the gimball 13, and via the body of the primary nut 10, to the secondary load path. As noted hereinbefore, there is, in normal use, a running clearance between the threads of the secondary load path load bearing nut 20 with respect to the ballscrew 8, and the locking nut 24 with respect to the ballscrew 8. Upon loading of the secondary load path the locking nut 24 is preferentially driven into engagement with the thread of the ballscrew 8. The locking nut 24 directly contacts the ballscrew 8 via frictional engagement between their respective surfaces. However, the locking nut 24 is also held with respect to the secondary load path load bearing nut 20 via low friction bearings 26.

Figure 7:
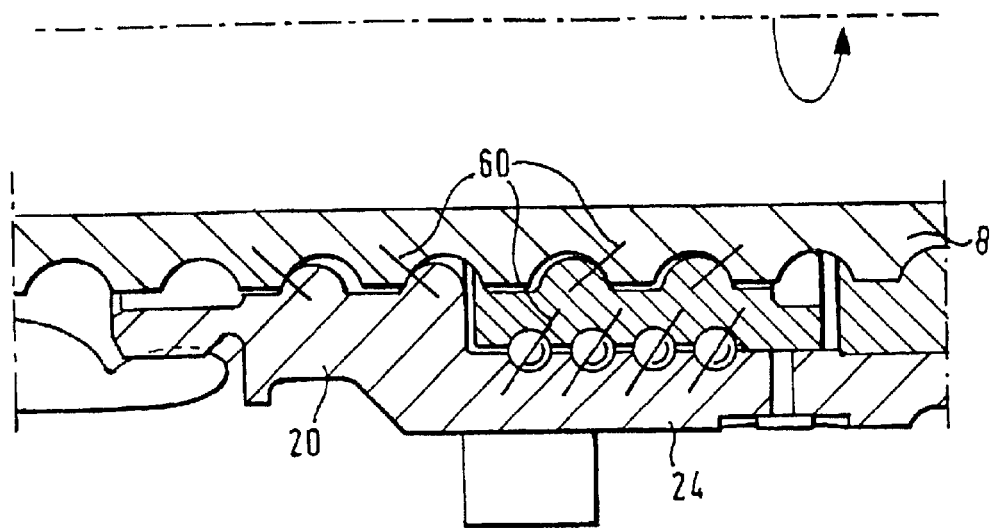
FIG. 7 is a partial cross-sectional diagram of the ballnut of FIG. 3 in the immobilized condition.

In the event of rotation of the ballscrew 8, the frictional engagement between the locking nut 24 and the ballscrew 8 will be significantly higher than the effective frictional engagement between the locking nut 24 and the secondary load path load bearing nut 20. Under these conditions, the locking nut 24 is urged to rotate with the ballscrew 8. This in turn, causes sheer pin 28 to fail thereby rotationally disconnecting the secondary load path nut load bearing nut 20 from the locking nut 24 while maintaining the nuts in longitudinal relationship such that they can undergo relative rotational motion. The minor amount of relative movement between the secondary load path load bearing nut 20 and the locking nut 24 brings the teeth of the secondary load path load bearing nut 20 into engagement with the thread of the ballscrew 8 thereby removing the clearance, as shown in FIG. 7. This engagement creates a "self serving" torque loop involving the thread of the ballscrew 8, the thread and body of the secondary load path nut 20, the low friction bearings 26 intermediate the secondary load path nut and the locking nut 24. Attempts to rotate the ballscrew 8 give rise to increasing levels of friction which form a locknut arrangement thereby causing further rotation of the ballscrew 8 to be inhibited. This has two consequences. Firstly, the trimable horizontal stabilizer is locked into position thereby ensuring that safe flight can be maintained, and secondly the fault is self enunciating in that the locking of the trimable horizontal stabilizer in position signals that a fault has occurred.

The shear pin 28 is dimensioned to withstand a small shear load, for example in the order of 100–600 Nm, to avoid unwanted accidental fracturing of the shear pin.

In an alternative failure mode, involving failure of the gimball or any primary attachment, load from the aircraft strut (not shown) is transferred immediately to the end plate 14, and from there via elements 15 to the body of the secondary load path nut 20 via gimball 25 (FIG. 6). The interconnection between the secondary load path nut 20 and the primary load path nut 10 allows for a small amount of relative motion there between. The interconnection allowing a small amount of axial motion under load can be formed via the upstanding elements 50 and plates 52 (FIG. 3). Relative rotation between the primary locknut and the secondary locknut is prevented by splined interengagement between the nuts, shown generally in region 54 of FIG. 3.

The transfer of load to the secondary load path nut, and the nature of the interconnection between it and the primary load path nut, allows the secondary load path load bearing nut 20 and locking nut 24 to move slightly with respect to the primary load path nut 10, thereby removing the clearance between the helical thread of the locking nut 24, and the thread of the ballscrew 8. This in turn allows the locking nut 24 to frictionally engage with the ballscrew 8 such than an attempt to rotate the ballscrew 8 urges the locking nut 24 to rotate with the thread of the ballscrew 8. This in turn causes the sheer pin 28 to fail and a load loop is set up involving the shaft of the ballscrew 8, the secondary load path load bearing nut 20, the bearings 26, and the locking nut 24. The load path loop is such that an attempt to rotate the shaft 8 causes the locking nut 24 to try and move out of synchronisation with respect to the secondary load path load bearing nut 20, thereby increasing the frictional forces between each of them with respect to each other and the ballscrew 8. This again causes the motion of the ballscrew 8 to become stalled thereby locking the horizontal stabilizers in position.

Figure 8:
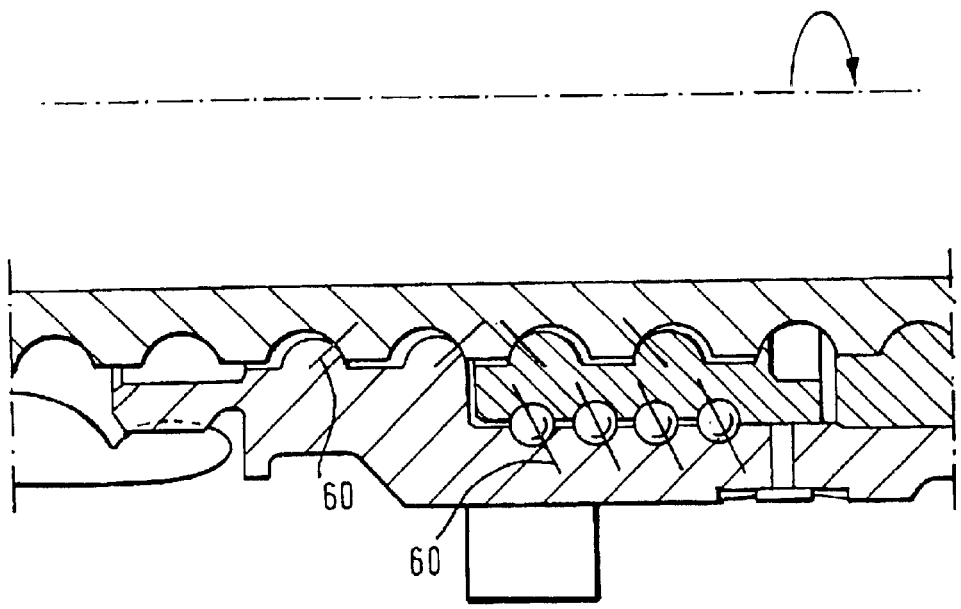
FIG. 8 is a further cross-sectional diagram of the ballnut in the immobilized condition.

FIG. 7 shows the relative positions of the secondary load path load bearing nut 20 and the locknut 24 after an attempt to rotate the ballscrew shaft 8 in one direction (clockwise). FIG. 8 shows, by way of comparison, the relative positions after an attempt has been made to rotate the shaft in the opposite direction (counterclockwise).

It can be seen that, the directions of the reaction forces charge, as indicated by the solid lines 60 in figures. In each case the nut 20 and the locknut 24 are forced into engagement with the thread of the ballscrew, the reaction forces being in opposite directions giving rise to a self locating operation.

What is claimed is:

1. A ballnut assembly comprising a primary load path nut in threaded engagement with a ballscrew shaft and a secondary load path nut in threaded engagement with the ballscrew shaft, the primary load path nut forming a primary load path for transmitting a load between a load element and the ballscrew shaft, wherein in an event of failure of the primary load path linear translation of the primary load path nut with respect to the ballscrew shaft is substantially prevented in at least one direction wherein the secondary load path nut comprises a first threaded portion and a second threaded portion, the first and second threaded portions being connected together by a connection which allows relative motion between the first and second threaded portions once a torque there between exceeds a predetermined value.

2. A ballnut assembly as claimed in claim 1, in which in the event of failure of the primary load path the secondary load path nut becomes immobilized with respect to the ballscrew shaft.

3. A ballnut assembly as claimed in claim 1, in which the secondary load path nut is connected to the primary load path nut such that they translate along the ballscrew shaft together.

4. A ballnut assembly as claimed in claim 3, in which a low friction rotational bearing is provided at an interface between the first and second threaded portions.

5. A ballnut assembly as claimed in claim 1, wherein the first and second threaded portions being connected together by means of a frangible connector.

6. A ballnut assembly as claimed in claim 5, in which a low friction rotational bearing is provided at an interface between the first and second threaded portions.

7. A ballnut assembly as claimed in claim 1, in which the first threaded portion and the second threaded portion of the secondary load path nut are dimensioned so as to have a running clearance between their respective threads and the thread of the ballscrew shaft during normal operation.

8. A ballnut assembly as claimed in claim 7, in which, in the event of failure of the primary load path, the running clearance between the second threaded portion of the secondary load path nut and the ballscrew shaft is eliminated, bringing the second threaded portion into frictional contact with the ballscrew shaft, whereby the second threaded portion is urged to rotate with the ballscrew shaft due to the frictional contact.

9. A ballnut assembly as claimed in claim 8, in which rotational movement of the second threaded portion occurring as a result of rotation of the ballscrew shaft causes the connection between the first and second threaded portions of the secondary load path nut to be overcome, thereby permitting relative movement between the first and second threaded portions.

10. A ballnut assembly as claimed in claim 9, in which the movement is sufficient to allow the clearance between the threads of the first threaded portion of the secondary load path nut and the ballscrew shaft to be eliminated, such that frictional engagement occurs there between.

11. A ballnut assembly as claimed in claim 10, in which the movement between the first and second threaded portion of the secondary load path nut causes the frictional forces to increase further.

12. An actuator including a ballnut assembly as claimed in claim 1.

13. A trimable horizontal stabilizer actuator mechanism comprising a threaded ballscrew shaft and a ballnut assembly as claimed in claim 1.

14. A locknut for use with an actuator having a primary load nut driven along a threaded shaft, the locknut being placed in a secondary load path such that it becomes subjected to a load in an event of failure within the primary load path, wherein the locknut includes first and second threaded nut portions which, when the nut is not loaded, have a running with the threaded shaft; and when the nut is loaded, the running clearance between the first and second threaded nut portions and the shaft is eliminated causing the locknut to resist translation along the shaft wherein the first and second portions being connected together by a connection which allows relative motion between the first and second threaded portions one the torque there between exceeds a predetermined value.

15. A ballnut assembly comprising a primary load path nut in threaded engagement with a ballscrew shaft and a secondary load path nut in threaded engagement with the ballscrew shaft, wherein the secondary load path nut has a first threaded portion and a second threaded portion connected together by means of a frangible connector, and wherein the primary load path nut forms a primary load path for transmitting a load between a load element and the ballscrew shaft, and wherein in an event of failure of the primary load path the load is transferred to the secondary load path nut, causing one of the portions of the secondary load path nut to frictionally engage with the ballscrew such that rotation of the ballscrew breaks the frangible connector thereby allowing the first and second threaded portions of the secondary loadpath nut to lock against each other such that their motion along the ballscrew is inhibited.

16. A ballnut assembly comprising a primary load path nut in threaded engagement with a ballscrew shaft and a secondary load path nut in threaded engagement with the ballscrew shaft, the secondary load path including a first threaded portion and a second threaded portion, the first and second threaded portions being connected together by a connection which allows relative motion between the portions once the torque therebetween exceeds a predetermined value such that the portions move to abut one another and become locked onto the ballscrew, and the primary load path nut forming a primary load path for transmitting a load between a load element and the ballscrew shaft, wherein an event of failure of the primary load path the second load path nut becomes loaded such that further rotation of the ballscrew in one direction causes the first and second threaded portions to lock onto the ballscrew.

* * * * *